United States Patent [19]
Boes et al.

[11] Patent Number: 5,807,494
[45] Date of Patent: Sep. 15, 1998

[54] GEL COMPOSITIONS COMPRISING SILICA AND FUNCTIONALIZED CARBON PRODUCTS

[76] Inventors: Ralph Ulrich Boes, 25 Concord Green #4, West Concord, Mass. 01742; James A. Belmont, 8 Conant St.; David J. Kaul, 13 Wyndcliff Rd., both of Acton, Mass. 01720; Douglas M. Smith, 1412 Marquette Pl., NE., Albuquerque, N. Mex. 87106; William C. Ackerman, 4809 Choctaw Trail NW., Alburquerque, N. Mex. 87120

[21] Appl. No.: 356,849

[22] Filed: Dec. 15, 1994

[51] Int. Cl.$^6$ .................................................. C01B 33/14
[52] U.S. Cl. ..................... 252/62; 252/315.6; 106/472; 423/449.2
[58] Field of Search .................................. 252/62, 315.1, 252/315.2, 315.6; 106/472; 423/449.2

[56] References Cited

U.S. PATENT DOCUMENTS

| | | | |
|---|---|---|---|
| T860,001 | 3/1969 | Gessler ................................. | 260/41.5 |
| 2,121,535 | 6/1938 | Amon . | |
| 2,156,591 | 5/1939 | Jacobson ................................ | 196/50 |
| 2,188,007 | 1/1940 | Kistler . | |
| 2,502,254 | 3/1950 | Glassman ............................... | 106/289 |
| 2,514,236 | 7/1950 | Glassman . | |
| 2,625,492 | 1/1953 | Young .................................... | 106/308 |
| 2,793,100 | 5/1957 | Weihe .................................... | 23/209.1 |
| 2,833,736 | 5/1958 | Glaser ................................... | 260/29.6 |
| 2,867,540 | 1/1959 | Harris .................................... | 106/307 |
| 3,011,902 | 12/1961 | Jordon .................................... | 106/307 |
| 3,025,259 | 3/1962 | Watson et al. . | |
| 3,043,708 | 7/1962 | Watson et al. . | |
| 3,151,365 | 10/1964 | Glaser et al. . | |
| 3,169,927 | 2/1965 | Matsch . | |
| 3,335,020 | 8/1967 | Aboytes et al. . | |
| 3,335,049 | 8/1967 | Pultz ..................................... | 428/367 |
| 3,479,300 | 11/1969 | Rivin et al. . | |
| 3,528,840 | 9/1970 | Aboytes ................................. | 106/307 |
| 3,607,813 | 9/1971 | Purcell et al. ......................... | 260/29.6 |
| 3,674,670 | 7/1972 | Erikson et al. ......................... | 204/181 |
| 3,686,111 | 8/1972 | Makhlouf et al. ...................... | 260/31.2 |
| 3,846,141 | 11/1974 | Ostergren et al. ....................... | 106/22 |
| 3,869,334 | 3/1975 | Hughes et al. . | |
| 3,876,603 | 4/1975 | Makhlouf ............................ | 260/31.2 N |
| 4,003,751 | 1/1977 | Carder .................................... | 106/20 |
| 4,006,031 | 2/1977 | Ferch et al. . | |
| 4,014,833 | 3/1977 | Story ..................................... | 260/29 |
| 4,014,844 | 3/1977 | Vidal et al. . | |
| 4,061,830 | 12/1977 | Greenberg ............................. | 428/469 |
| 4,176,361 | 11/1979 | Kawada et al. ........................ | 346/1.1 |
| 4,204,871 | 5/1980 | Johnson et al. ........................ | 106/20 |
| 4,204,876 | 5/1980 | Bowden . | |
| 4,221,672 | 9/1980 | McWilliams . | |
| 4,290,072 | 9/1981 | Mansukhani ........................... | 346/1.1 |
| 4,293,394 | 10/1981 | Darlington et al. ..................... | 204/98 |
| 4,308,061 | 12/1981 | Iwahashi et al. ........................ | 106/22 |
| 4,328,041 | 5/1982 | Winston . | |
| 4,391,873 | 7/1983 | Brassell et al. ......................... | 428/297 |
| 4,442,256 | 4/1984 | Miller ..................................... | 524/539 |

(List continued on next page.)

FOREIGN PATENT DOCUMENTS

| | | |
|---|---|---|
| 0 006 190 A1 | 1/1980 | European Pat. Off. . |
| 0 055 235 | 6/1982 | European Pat. Off. . |
| 0 108 813 | 5/1984 | European Pat. Off. . |
| 0 441 987 A2 | 8/1991 | European Pat. Off. . |
| 1164786 | 4/1960 | France . |
| 1215895 | 4/1960 | France . |
| 1224131 | 6/1960 | France . |
| 1331889 | 5/1963 | France . |
| 909 131 | 5/1954 | Germany . |
| 24 26 266 A1 | 12/1975 | Germany . |
| 3170748 | 7/1985 | Germany . |
| 4343358 | 12/1993 | Germany . |
| 62-250073 | 10/1987 | Japan . |
| 94-320662 | 12/1993 | Japan . |
| 862018 | 3/1961 | United Kingdom . |
| 958 081 | 5/1964 | United Kingdom . |
| 1191872 | 5/1970 | United Kingdom . |
| 2 188 311 | 9/1987 | United Kingdom . |
| WO 91/15425 | 10/1991 | WIPO . |
| WO 92/13983 | 8/1992 | WIPO . |

OTHER PUBLICATIONS

J. R. Hardee et al., Journal of Polymer Science: Part A: Polymer Chemistry, 1990, 28, 3669, Dec. 1990.
Aldrich Chemical Co., Milwaukee, WI, 1994–1995 Catalog, p. T137.
International Search Report for corresponding PCT Application No. PCT/US95/16196 with references.
J. Am Chem. Soc. 1992, 114, 5883–5884.
Derwent Abstract WPI Acc No. 95–062248/09, European Application No. 636591, Feb. 1, 1995.
Derwent Abstract, AN No. 80–03330C, "Sulphonated Carbon Pigment Production by Treating Technical Grade Carbon with Hot Aqueous Acid," Jan. 13, 1976.
Derwent Abstract, AN NO. 82–28019E, "Penetrating Flexographic Print Ink Based Polyacrylic Resin," Oct. 17, 1979.

(List continued on next page.)

*Primary Examiner*—Charles T. Jordan
*Assistant Examiner*—John R. Hardee

[57] ABSTRACT

New gel compositions which comprise a carbonaceous component attached to a gel component. Preferably, the carbonaceous component is selected from the group consisting of: carbon blacks, carbon fibers, activated carbons and graphitic carbons; and the gel component is selected from the group consisting of: metal oxide gels and polymeric gels. ☐ Also disclosed are new gel compositions comprising: a gel component and a carbon black product having attached at least one organic group, the organic group comprising: a) at least one aromatic group, and b) at least one ionic group, at least one ionizable group, or a mixture of an ionic group and an ionizable group, wherein at least one aromatic group of the organic group is directly attached to the carbon black. Further disclosed are new gel compositions comprising: a gel component and a carbon black product having attached at least one organic group, the organic group comprising: a) at least one $C_1$–$C_{12}$ alkyl group, and b) at least one ionic group, at least one ionizable group, or a mixture of an ionic group and an ionizable group, wherein at least one alkyl group of the organic group is directly attached to the carbon black. Uses for the gel compositions are also disclosed.

12 Claims, 4 Drawing Sheets

U.S. PATENT DOCUMENTS

| | | | |
|---|---|---|---|
| 4,451,597 | 5/1984 | Victorius | 524/39 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,525,521 | 6/1985 | DenHartog et al. | 524/517 |
| 4,525,570 | 6/1985 | Blum et al. | 528/75 |
| 4,530,961 | 7/1985 | Nguyen et al. | |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 |
| 4,595,578 | 6/1986 | Cohen et al. | |
| 4,597,794 | 7/1986 | Ohta et al. | 106/20 |
| 4,605,596 | 8/1986 | Fry | 428/423.3 |
| 4,619,908 | 10/1986 | Cheng et al. | |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,667,417 | 5/1987 | Graser et al. | |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/510 |
| 4,719,132 | 1/1988 | Porter, Jr. | 427/409 |
| 4,727,100 | 2/1988 | Vasta | 524/40 |
| 4,741,780 | 5/1988 | Atkinson | |
| 4,752,532 | 6/1988 | Starka | 428/482 |
| 4,764,430 | 8/1988 | Blackburn et al. | 428/413 |
| 4,770,706 | 9/1988 | Piestch | 106/24 |
| 4,770,715 | 9/1988 | Mandel et al. | 134/40 |
| 4,789,400 | 12/1988 | Solodar et al. | 106/22 |
| 4,798,745 | 1/1989 | Martz et al. | 427/407 X |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,840,674 | 6/1989 | Schwarz | 106/22 |
| 4,853,037 | 8/1989 | Johnson et al. | 106/22 |
| 4,883,838 | 11/1989 | Jung et al. | 525/119 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,954,327 | 9/1990 | Blount | |
| 4,975,474 | 12/1990 | Barsotti et al. | 523/400 |
| 4,994,520 | 2/1991 | Mori et al. | 524/547 |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson et al. | 524/555 |
| 5,064,719 | 11/1991 | DenHartog et al. | 428/411.1 |
| 5,066,733 | 11/1991 | Martz et al. | 525/455 |
| 5,076,843 | 12/1991 | Acitelli et al. | 106/22 |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 |
| 5,106,417 | 4/1992 | Hauser et al. | 106/20 |
| 5,114,477 | 5/1992 | Mort et al. | 106/20 |
| 5,122,291 | 6/1992 | Wolff et al. | |
| 5,122,552 | 6/1992 | Johnson | 523/454 |
| 5,130,004 | 7/1992 | Johnsonn et al. | 204/181.7 |
| 5,130,363 | 7/1992 | Scholl et al. | 524/392 |
| 5,141,556 | 8/1992 | Matrick | 106/20 |
| 5,159,009 | 10/1992 | Wolff et al. | 524/495 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 346/1.1 |
| 5,190,582 | 3/1993 | Shinozuka et al. | 106/20 D |
| 5,200,164 | 4/1993 | Medalia et al. | |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425.8 |
| 5,229,452 | 7/1993 | Green et al. | 524/415 |
| 5,232,974 | 8/1993 | Branan, Jr. et al. | 524/495 |
| 5,236,992 | 8/1993 | Bush | 524/495 |
| 5,240,968 | 8/1993 | Paquet et al. | |
| 5,242,751 | 9/1993 | Hartman | 428/324 |
| 5,266,361 | 11/1993 | Schwarte et al. | 427/407.1 |
| 5,266,406 | 11/1993 | DenHartog et al. | 428/423.1 |
| 5,276,097 | 1/1994 | Hoffmann et al. | 525/167 |
| 5,281,261 | 1/1994 | Lin | |
| 5,288,788 | 2/1994 | Shieh et al. | 524/495 |
| 5,290,848 | 3/1994 | Palmer et al. | 524/517 |
| 5,302,197 | 4/1994 | Wickramanayke et al. | 106/22 H |
| 5,306,555 | 4/1994 | Ramamurthi et al. | |
| 5,310,778 | 5/1994 | Shor et al. | 524/556 |
| 5,314,945 | 5/1994 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,334,650 | 8/1994 | Serdiuk et al. | 524/591 |
| 5,336,716 | 8/1994 | Kappes et al. | 525/23 |
| 5,336,753 | 8/1994 | Jung et al. | 528/335 |
| 5,352,289 | 10/1994 | Weaver et al. | 106/476 |
| 5,356,973 | 10/1994 | Taljan et al. | 524/314 |
| 5,366,828 | 11/1994 | Struthers | 106/712 |
| 5,397,807 | 3/1995 | Hitchcock et al. | |
| 5,401,313 | 3/1995 | Supplee et al. | 106/712 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |

OTHER PUBLICATIONS

Derwent Abstract, AN No. 86–335147, "Wear Resistant Rubber Composition for Tire Tread Rubber," Apr. 30, 1985.

Derwent Abstract WPI Acc No. 94–031974/04, Japanese Patent Application No. 92145679, 1992.

Derwent Abstract WPI Acc No. 94–072121/09, Japanese Patent Application No. 9295517, 1992.

Derwent Abstract WPI Acc No. 94–121502/15, Japanese Patent Application No. 92241473, 1992.

Derwent Abstract WPI Acc No. 94–124167/15, Japanese Patent Application No. 9133147, 1991.

Derwent Abstract, AN No. 95–183086, "Tire Treated Rubber Composition," Oct. 21, 1993.

Derwent Abstract, AN No. 94–189154, "Ink for Writing Implements," May 10, 1994.

Patent Abstracts of Japan Publication No. JP7102116, "Rubber Composition for Tire Tread," Apr. 18, 1995.

Derwent Abstract WPI Acc No. 88–169392/25, European Patent Application No. 272127, Dec. 17, 1987.

Derwent Abstract WPI Acc No. 91–030585/05, European Patent Application No. 410152, Jun. 26, 1990.

Derwent Abstract WPI Acc No. 91–180009/25, European Patent Application No. 433229, Dec. 3, 1990.

Moschopedis, et al., "The Reaction of Diazonium Salts with Humic Acids and Coals: Evidence for Activated Methylene Bridges in Coals and Humic Acids," *Fuel,* vol. 43, No. 4, pp. 189–198, 1964.

Roberts et al., *Basic Principles of Organic Chemistry,* Second Edition, W.A. Benjamin, Inc., Pub., p., 1080.

Allen, "Thermal Ink Jet Printing Trends and Advances," BLS Ink Jet Printing Conference, Oct. 10–12, 1994, Monterey, California.

Schneider, "Continuous Ink Jet," BLS Ink Jet Printing Conference, Oct. 10–12, 1994, Monterey, California.

Major, "Formulating the Future of Automotive Coatings," *Modern Paint and Coatings,* Jul. 1993.

Greenfield, "Fewer Formulation Options Lead to Emphasis on Familiar," *Modern Paint and Coatings,* Jul. 1992.

Schrantz, "Regulations and Competition Push Technological Change," *Modern Paint and Coatings,* Jul. 1994.

"Regulations Focus Formulator Attention on Additives," *Modern Paint and Coatings,* Jul. 1994.

*The Printing Ink Manual,* Fifth Edition, R.H. Leach et al., Blueprint Press, Chapters 8, 9, 10.

Tsubokawa, "Functionalization of Carbon Black by Surface Grafting of Polymers," *Polym. Sci.,* vol. 17, pp. 417–470, 1992.

Wolff et al., "The Influence of Modified Carbon Blacks on Viscoelastic Compound Propertiws," *Kautschuk & Gummi,* Kuststoffe 44, Jahrgang, Nr. Oct. 1991.

Bourdillon et al., "Immobilization of Glucose Oxidase on a Carbon Surface Derivatized by Electrochemical Reduction of Diazonium Salts," *J. Electroanal. Chem.,* vol. 336, pp. 113–123, 1992.

Moschopedis et al., "The Reaction of Diazonium Salts with Humic Acids and Coats: Evidence for Activated Methylene Bridges in Coals and Humic Acids," *Fuel,* vol. 43, No. 4, pp. 289–298 (1964).

Ohkita et al., "The Reaction of Carbon Black Surface with 2,2–Diphenyl–1–Picrylhydrazyl," *Carbon,* vol. 10, No. 5, pp. 631–636, 1972.

Watson, "Chemical Aspects of Reinforcement," Compounding Research Department, Dunlop Research Center, Dunlop Rubber Co., pp. 987–999.

Garten et al., "Nature of Chemisorptive Mechanisms In Rubber Reinforcement," Commonwealth Scientific and Industrial Research Organ., Div. of Industrial Chem., Melbourne, Australia, pp. 596–609.

Donnet et al., "Chemie Superficielle et Sites Privilegies Des Charges Fines," Extrait de la Revue Generale du Caoutchoic, Jul. 1959.

*Ullmann's Encyclopedia of Industrial Chemistry,* Fifth Edition, vol. A–8, pp. 508–509, 1987.

Donnet et al., "Sur la Structure Aroxylique des Groupements Quinoniques et des Radicaux Libres Presentes en Surface des Noirs de Carbon," *Ref. Gen. Caoutchouc Plastiques,* vol. 42, No. 3, pp. 389–392, 1965 (with English Abstract).

Yamaguchi et al., "Novel Carbon Black/Rubber Coupling Agent," *Kautschuk & Gummi,* Kuntstoffe 42, Jahrgang, Nr. May. 1989.

Studebaker et al., "Oxygen–Containing Groups on the Surface of Carbon Black," *Industrial and Engineering Chemistry,* vol. 48, No. 1, pp. 162–166, Jan. 1956.

Zoheidi et al., "Role of Oxygen Surface Groups in Catalysis of Hydrogasification of Carbon Black by Potassium Carbonate," *Carbon,* vol. 25, No. 6, pp. 809–819, 1987.

Scherrer, "Coloration of Ink Jet Inks," Presentation at BIS Ink Jet Printing Conference, Oct. 10–12, 1994, Monterey.

*Ink Jet Printing: 1994 Overview and Outlook,* Chapter 7.

Andreottoia, *Ink Jet Ink Technology,* pp. 531–544.

Gregory," *High–Technology Applications of Organic Colorants,* Chapter 9, Ink–Jet Printing," 1991.

PCT Search Report, PCT/US 95 16452, Apr. 17, 1996.

PCT Search Report, PCT/US 95.16195, Apr. 19, 1996.

PCT Search Report, PCT/US 95/16281, Apr. 26, 1996.

PCT Search Report, PCT/IB 95/01154, Apr. 29, 1996.

PCT Search Report, PCT/US 94/16453, May 5, 1996.

Chemical Abstract No. 113:116901, Nov. 6, 1989.

Chemial Abstract No. 120:325954 Feb. 1, 1994.

RAPRA Abstract No. 432845, "Compounding Heat Resistant Non–Black EPDM Rubber Compounding Report," Dec. 1990.

RAPRA Abstract No. 417612, "Review: Polymer–Filler Interactions in Rubber Reinforcement," Oct. 1990.

RAPRA Abstract No. 403202, "Organotitanate, Zirconate Effect on Elastomers," Jun. 1990.

RAPRA Abstract No. 394030, "Mechanical Properties of Natural Rubber/Grafted Cellulose Fibre Composites," 1990.

RAPRA Abstract No. 390600, "Application of Coupling Agents to Elastomers," 1989.

Dialog Abstract, U.S. Pat. No. 5,286,286, Feb. 12, 1992.

Derwent Abstract WPI Acc No. 81–70427D/39, French Patent No. 2,477,493, Sep. 11,1981.

Derwent Abstract WPI Acc No. 88–175481/25, French Patent No. 2,607,528, Jun. 3, 1988.

Derwent Abstract WPI Acc No. 85–297588/48, French Patent No. 2,564,489, Nov. 22, 1985.

Derwent Abstract WPI Acc No. 84–155581/25, Japanese Patent No. 59–082467, May 12, 1984.

RAPRA Abstract No. 00388935, "Light Coulored Fillers in Polymers," Nov. 1989.

Dialog Abstract EMA No. 8602–C1–D–0297, "Carbon Black is Better With Silica," Oct. 1985.

RAPRA Abstract No. 00343229, "White and Black Fillers for Rubber Compounds," Dec. 1986.

RAPRA Abstract No. 00177481, "Ethylene–Propylene Rubbers," 1981.

RAPRA Abstract No. 00105623, "Putting Performance Into Thermosets with Titanium Coupling Agents," Oct. 1976.

RAPRA Abstract No. 00056893, "Applications for Silane Coupling Agents in the Automotive Industry," Oct. 1975.

RAPRA Abstract No. 00002608, "Ground Rice Hull Ash as a Filler for Rubber," Oct. 1974.

RAPRA Abstract No. 00000937, "Reduction of Heat Build–up in Mineral–Filled Elastomers Through the Use of Silane Coupling Agents," May 1973.

U.S. Patent application No. 08/572,336, Dec. 14, 1995.

U.S. Patent application No. 08/572,545, Dec. 1995.

GEL COMPOSITIONS COMPRISING SILICA AND FUNCTIONALIZED CARBON PRODUCTS

FIELD OF THE INVENTION

The present invention relates to new gel compositions.

BACKGROUND

Gels and processes for producing them, are well known. As used herein the term "gel" encompasses aerogels, xerogels, hydrogels and other gels known in the art. The term "aerogel" was coined by S. S. Kistler in U.S. Pat. No. 2,188,007 and is generally utilized to refer to a gel which has been dried under supercritical temperature/pressure conditions. Gels, in particular aerogels, are utilized in a wide variety of applications, including thermal and acoustic insulation, catalyst supports and carriers, filters and molecular sieves and electronics.

Gels having lower bulk densities are more advantageous for use in many applications. Because of their lower bulk densities, aerogels have become the gel of choice for many applications. However, as set forth above, aerogels are typically produced utilizing supercritical drying, which requires the use of relatively expensive processing equipment and conditions.

It is also advantageous for certain applications, such as adsorbents to use gels having higher bulk densities.

SUMMARY OF THE INVENTION

The present invention provides a new gel composition which has improved performance properties in comparison with heretofore known gels. The gel composition of the present invention comprises:

a carbonaceous component attached to a gel component. The carbonaceous component may be selected from the group consisting of: carbon blacks, carbon fibers, activated carbons and graphitic carbons attachable to a gel component. If necessary, the carbonaceous component may be modified so that the carbonaceous component will attach to the gel component of the gel composition of the present invention. Preferably, the carbonaceous component is chemically modified.

The present invention also includes a new gel composition comprising:

a gel component and a carbon black product having attached at least one organic group, the organic group comprising: a) at least one aromatic group, and b) at least one ionic group, at least one ionizable group, or a mixture of an ionic group and an ionizable group, wherein at least one aromatic group of the organic group is directly attached to the carbon black. Details relating to a process for preparing the carbon black product, and preferred embodiments of the new gel composition, are set forth in the following Detailed Description of the Invention Section.

The present invention further includes a new gel composition comprising:

a gel component and a carbon black product having attached at least one organic group, the organic group comprising: a) at least one $C_1$–$C_{12}$ alkyl group, and b) at least one ionic group, at least one ionizable group, or a mixture of an ionic group and an ionizable group, wherein at least one alkyl group of the organic group is directly attached to the carbon black. Details relating to processes for preparing the carbon black product, and preferred embodiments of the new gel composition are set forth in the following Detailed Description of the Invention Section.

Suitable gel components for use in the gel compositions of the present invention include metal oxide gels such as silica gels, titania gels, alumina gels and the like; and polymeric gels, such as resorcinol-formaldehyde (R—F) gels, melamine formaldehyde (M—F) gels, phenol-furfural (P—F) gels and the like. The preferred gel component is a metal oxide gel.

The amount of carbonaceous component included in the gel compositions will depend on the intended end use of the gel composition. Generally, amounts of 1–99%, by weight of the carbonaceous component, may be utilized in the gel composition of the present invention. Where it is desirable to produce a gel composition having a lower bulk density, amounts of 1–50%, by weight, preferably 10–20%, by weight, of the carbonaceous component are utilized in the gel composition of the present invention. Alternatively, where it is desirable to produce a gel composition having a higher bulk density, amounts of 50–99%, by weight, preferably 75–85%, by weight, of the carbonaceous component are utilized in the gel composition of the present invention. As used herein, "bulk density" refers to the mass of a gel particle divided by the total volume of the particle.

The gel compositions of the present invention may be advantageously utilized in applications known to those of ordinary skill in the art for gel compositions. In particular, the gel compositions of the present invention may be utilized in applications which include the following:

Insulation, including thermal, electrical and acoustic insulation.

Particulate Additives, including flatting agents, thickeners, fillers and reinforcing agents Adsorbents Catalyst Supports Membranes Filters Radiation Detectors Coatings, including heat resistant coatings Dielectrics, including low K dielectrics.

Further details relating to the gel compositions of the present invention, their preparation and their uses are set forth in the following Detailed Description of the Invention section. The advantages of the gel compositions of the present invention will become apparent to those of ordinary skill in the art from the following more detailed description.

DETAILED DESCRIPTION OF THE INVENTION

As set forth above, the gel composition of the present invention comprises:

a carbonaceous component attached to a gel component. The accompanying scanning electron microscope photograph Figures are provided to illustrate particular carbonaceous components attached to a gel component.

Figure 1:
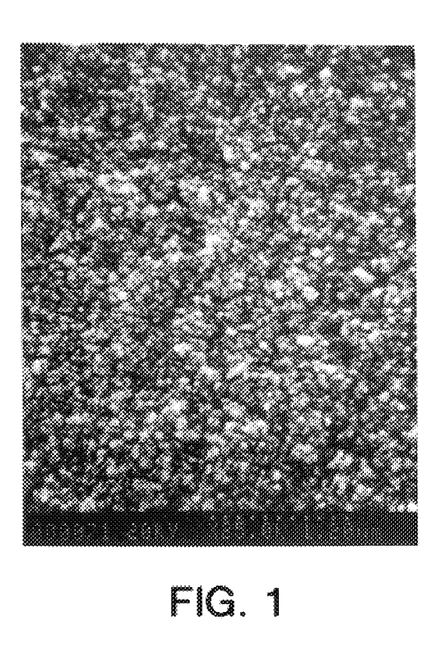
FIG. 1 is a scanning electron microscope (SEM) photograph of a fracture surface of the gel composition, dried from heptane, produced in Example 5.

FIG. 1 is a SEM of a fracture surface of a gel composition which does not include a carbonaceous component.

Figure 2:
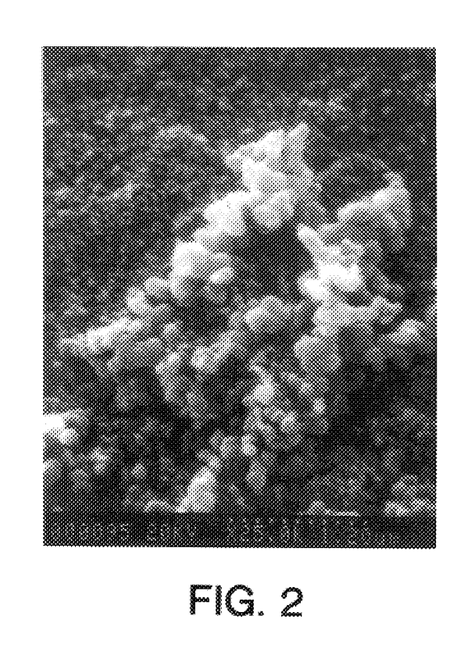
FIG. 2 is a SEM photograph of a fracture surface of the gel composition, dried from heptane, produced in Example 8.
Figure 3:
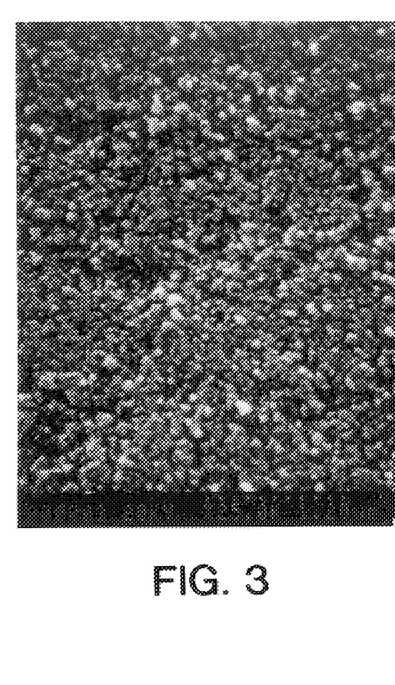
FIG. 3 is a SEM photograph of a fracture surface of the gel composition, dried from heptane, produced in Example 14.

FIG. 2 is a SEM of a fracture surface of a gel composition which includes a carbonaceous component which is not attached to the gel component. In contrast, FIG. 3 is a SEM of a fracture surface of a gel composition which includes a carbonaceous component which is attached to the gel component.

A more detailed explanation of FIGS. 1–3, and an explanation of the remaining FIGS. 4–8, is set forth below in the Examples section.

In addition, the Rub-off characteristics of gel compositions of the present invention, wherein the carbonaceous component is attached to the gel component, are lower than that of comparable gel compositions wherein the carbonaceous component is not attached to the gel component. Further details relating to Rub-off are set forth in the following Examples section.

The carbonaceous component of the gel composition of the present invention may be selected from the group consisting of: carbon blacks attachable to a gel component, carbon fibers attachable to a gel component, activated carbons attachable to a gel component and graphitic carbons attachable to a gel component. Certain carbonaceous components will not become attached to a gel component unless modified. Preferably, the carbonaceous component is chemically modified in the following manner.

An attachable carbonaceous component may be prepared by reacting a carbonaceous component with a diazonium salt in a liquid reaction medium to attach at least one organic group to the surface of the carbonaceous component. Preferred reaction media include water, any medium containing water, and any medium containing alcohol. Water is the most preferred medium. Modified carbonaceous components and various methods for their preparation are described in the U.S. patent application entitled "Reaction of Carbon Black with Diazonium Salts, Resultant Carbon Black Products and Their Uses," filed Dec. 15, 1994, and assigned Ser. No. 08/356,660 the same day as the present application, and incorporated herein by reference. Modified carbonaceous components and various methods for their preparation are also described in the U.S. patent application entitled "Reaction of Carbon Materials With Diazonium Salts and Resultant Carbon Products" filed Dec. 15, 1994, and assigned Ser. No. 08/356,653, now U.S. Pat. No. 5,554,739 issued Sep. 10, 1996 the same day as the present application, and also incorporated herein by reference.

A method of preparing attachable carbonaceous components, for use in the gel compositions of the present invention, is described in the following paragraph with reference to carbon black as the carbonaceous component. Similar methods could be performed to prepare attachable carbonaceous components other than carbon black.

To prepare attachable carbon black, the diazonium salt need only be sufficiently stable to allow reaction with the carbon black. Thus, that reaction can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

The carbon black can be reacted with a diazonium salt when present as a dilute, easily stirred, aqueous slurry, or in the presence of the proper amount of water for carbon black pellet formation. If desired, carbon black pellets may be formed utilizing a conventional pelletizing technology.

A preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the $C_{1-12}$ alkyl group of the organic group is directly attached to the carbon black. The aromatic group may be further substituted or unsubstituted, for example, with alkyl groups. The $C_1$–$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include —COOH, —$SO_3H$ and —$PO_3H_2$, and their salts, for example —COONa, —COOK, —COO$^-$$NR_4^+$, —$SO_3Na$, —$HPO_3Na$, —$SO_3^-NR_4^+$, and $PO_3Na_2$, where R is an alkyl or phenyl group. Particularly preferred ionizable substituents are —COOH and —$SO_3H$ and their sodium and potassium salts.

Most preferably, the organic group is a substituted or unsubstituted sulfophenyl group or a salt thereof; a substituted or unsubstituted (polysulfo) phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion are p-sulfophenyl, 4hydroxy-3-sulfophenyl, and 2-sulfoethyl.

Amines represent examples of ionizable functional groups that form cationic groups and can be attached to the same organic groups as discussed above for the ionizable groups which form anions. For example, amines may be protonated to form ammonium groups in acidic media Preferably, an organic group having an amine substituent has a pKb of less than 5. Quaternary ammonium groups ($-NR_3^+$) and quaternary phosphonium groups ($-PR_3^+$) also represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and quaternized aromatic amines, can also be used as the organic group. Thus, N-substituted phyridinium compounds, such as N-methyl-pyridyl, can be used in this regard.

An advantage of the carbon black products having an attached organic group substituted with an ionic or an ionizable group is that the carbon black products may have increased water dispersibility relative to the corresponding untreated carbon black. In general, water dispersibility of the carbon black products increases with the number of organic groups attached to the carbon black having an ionizable group or the number of ionizable groups attached to a given organic group. Thus, increasing the number of ionizable groups associated with the carbon black products should increase their water dispersibility and permits control of the water dispersibility to a desired level. It can be noted that the water dispersibility of carbon black products containing an amine as the organic group attached to the carbon black may be increased by acidifying the aqueous media.

When water dispersible attachable carbon black products are prepared, it is preferred that the ionic or ionizable groups be ionized in the reaction medium. The resulting product solution or slurry may be used as is or diluted prior to use. Alternatively the carbon black products may be dried by techniques used for conventional carbon blacks. These techniques include, but are not limited to, drying in ovens and rotary kilns. Overdrying, however, may cause a loss in the degree of water dispersibility. In the event that the carbon black products above do not disperse in the aqueous vehicle as readily as desired, the carbon black products may be dispersed using conventionally known techniques such as milling or grinding.

In contrast to conventional carbon black pigments, the chemically modified, attachable carbon black products are not difficult to disperse in an aqueous medium. The chemically modified, attachable carbon black products do not necessarily require a conventional milling process, nor are dispersants necessarily needed to attain a usable dispersion. Preferably the chemically modified, attachable carbon black products only require low shear stirring or mixing to readily disperse the pigment in water.

Pellet formation from the attachable carbon black products is preferably performed using a conventional wet process, pin-pelletizing method. The resultant pellets are easily dispersed in water with minimal shear stirring or mixing, reducing or avoiding the need for milling or the use of a dispersant.

The present invention also includes a new gel composition comprising:

a gel component and a carbon black product having attached at least one organic group, the organic group comprising a) at least one aromatic group, and b) at least one ionic group, at least one ionizable group, or a mixture of an ionic group and an ionizable group, wherein at least one aromatic group of the organic group is directly attached to the carbon black. Preferably the ionic or ionizable group is selected from the group consisting of: a carboxylic acid or a salt thereof; a sulfonic acid or a salt thereof; and a quaternary ammonium salt. Preferably the organic group is selected from the group consisting of: a sulfophenyl group or a salt thereof; p-sulfophenyl or a salt thereof; and carboxyphenyl or a salt thereof. Carbon black products, suitable for use in the various embodiments of this gel composition of the present invention may be produced in the manner described above with reference to the creation of an attachable carbonaceous component.

The present invention further includes a new gel composition comprising:

a gel component and a carbon black product having attached at least one organic group, the organic group comprising a) at least one $C_1$–$C_{12}$ alkyl group, and b) at least one ionic group, at least one ionizable group, or a mixture of an ionic group and an ionizable group, wherein at least one alkyl group of the organic group is directly attached to the carbon black Preferably the ionic or the ionizable group is selected from the group consisting of: an ethane sulfonic acid or a salt thereof. Carbon black products, suitable for use in the various embodiments of this gel composition of the present invention may also be produced in the manner described above with reference to the creation of an attachable carbonaceous component.

The gel compositions of the present invention may be produced by any process known in the art for the preparation of gel compositions. For example, a gel composition of the present invention may be produced by the following method which relates to an alkoxide system:

1) Dissolving a precursor of the desired gel component (an alkoxide in this example) in alcohol;

2) Adding water to the solution so that the molar ratio of alkoxide to water is approximately 1;

3) Adding an acid to the resulting solution so that the molar ratio of water to acid equals approximately 1:0.0007 to produce a sol;

4) Adding a carbonaceous component to the sol;

5) Adding a catalyst (generally an acid or a base) to start gelation of the sol;

6) Aging the resulting gel in a mold for approximately 24 hours at 50° C.;

7) Washing the resulting gel with water to replace the solvent component with water, and then aging the gel in water at elevated temperature (up to 100° C., preferably approximately 70° C.) for up to 24 hours;

8) Washing the aged gel in solvent to bleed the water out and replace the water with solvent;

9) Drying the resulting gel to form a gel composition of the present invention.

Gel precursors, suitable for use in the gel composition of the present invention include, but are not limited to metal oxide gel precursors known in the art, such as:

| Metal Oxide | Form(s) as Gel Precursor |
|---|---|
| SiO$_2$ | Alkoxide, Sodium Silicate, Colloidal |
| TiO$_2$ | Alkoxide, Colloidal |
| Al$_2$O$_3$ | Alkoxides, Colloidal, Sodium Aluminate, Salts |

The choice of a particular precursor is made based on the type of gel desired.

Further details relating to the process for making a gel composition of the present invention, and exemplary processes are set forth below in the Examples section.

As set forth in the preceding section, the gel compositions of the present invention may be utilized for any application known for gel compositions. As will be recognized by those of ordinary skill in the art, whether a particular gel composition of the present invention is desirable for use in a particular application will depend on the characteristics of the gel composition, such as the amount of carbonaceous material incorporated into the composition and the bulk density of the composition.

Exemplary uses for gel compositions of the present invention include, but are not limited to the following:

Insulation Applications

The gel compositions of the present invention may advantageously be utilized in thermal, electrical and/or acoustical insulation applications as set forth below.

Thermal Insulation

A gel composition of the present invention may be incorporated as loose fill material in thermal insulation. In addition, a gel composition of the present invention may also be combined with a material selected from group consisting of: calcium silicate, a mineral fiber, a metal oxide powder, a polymer foam, fiberglass, and the like and the combination incorporated into thermal insulation. Alternatively, a gel composition of the present invention may be utilized under vacuum in thermal insulation.

Electrical Insulation

A gel composition of the present invention may be incorporated into a polymer composition intended for use as electrical insulation.

Acoustic Insulation

A gel composition of the present invention may be incorporated as a loose fill material in acoustic insulation. Alternatively, a gel composition of the present invention may be combined with another material, such as cellulose, or polymer foam, and the combination incorporated as fill material in acoustic insulation.

Particulate Additive Applications

The gel compositions of the present invention may be used as particulate additives, such as thickeners, flatters, fillers or reinforcing agents. Examples of each include the following:

Thickeners

A gel composition of the present invention may be utilized as a thickener in pigment compositions and printing inks. Non-toxic gel compositions of the present invention may also be utilized as a thickener in food products.

Flatters

The term "flatter" of "flatting agent" refers to composition which will dull or flatten the finish of a paint, varnish or film. A gel composition of the present invention may be utilized as a flatter for lacquers, semi-gloss varnishes, enamels or vinyl films.

Filler

A gel composition of the present invention may be utilized as a filler in cements, adhesives and natural or synthetic rubber compositions.

Reinforcing Agent

A gel composition of the present invention may also be utilized as a reinforcing agent in polymer compositions, such as molded brake linings and in natural or synthetic rubber compositions.

Adsorbent

A gel composition of the present invention may be utilized as a material for liquid, gas or vapor adsorption.

Catalyst Support

A gel composition of the present invention may be utilized as a host support for powdered metal, or metal oxide catalytic materials.

Membranes

A gel composition of the present invention may be utilized as a material for selective liquid, gas or vapor separations.

Filters

A gel composition of the present invention may be utilized as a filtration material for particulates.

Radiation Detectors

A gel composition of the present invention may be utilized to detect radiation in a radiation detector such as a Cherenkov radiation detector.

Heat Resistant Coating

A gel composition of the present invention may be utilized, in thin film form, as a thermal barrier coating.

Low K Dielectric

A gel composition of the present invention may be utilized in dielectric materials, for example as a low dielectric constant material.

As will be recognized by those of ordinary skill in the art from the foregoing list of applications, the gel compositions of the present invention may be utilized in many, if not all, of the applications which heretofore utilized conventional gel compositions. It will also be realized that the foregoing list is not an exhaustive list, but merely representative of the many potential uses for the gel compositions of the present invention.

The effectiveness and advantages of various aspects and embodiments of the present invention will be further illustrated by the following examples wherein the following testing procedures were utilized.

The nitrogen surface area (N$_2$SA) of the carbon blacks utilized in the examples, expressed as square meters per gram (m$^2$/g) was determined according to ASTM test procedure D3037 Method A.

The dibutyl phthalate adsorption value (DBP) of the carbon blacks utilized in the examples, expressed as milliliters per 100 grams of carbon black (ml/100 g), was determined according to the procedure set forth in ASTM D2414.

The average primary particle size of the carbon blacks utilized in the examples, expressed as nanometers (nm), was determined according to the procedure set forth in ASTM D3849.

The scanning electron microscope (SEM) photographs were produced utilizing a Hitachi S570 Scanning Electron Microscope, produced and sold by Hitachi Corporation. Each of the SEM photographs was taken at a power setting of 20 kilovolts, and a magnification of 25,000.

The aqueous residue of modified and unmodified carbon blacks was determined by the following procedure. The carbon black (5 g) was shaken with 45 g of water for 5 minutes. The resulting dispersion was poured through a screen and rinsed with water until the washings were colorless. A 325 mesh screen was used unless indicated otherwise. After drying the screen, the weight of residue on the screen was determined and expressed as a percentage of the carbon black used in the test.

The bulk density and rub-off of the gel compositions were determined by the following procedures:

Bulk Density

The gels were cast and formed in cylindrical molds. In all cases the cylindrical shape of the gel was preserved upon drying. The total gel volume was determined by physically measuring the dimensions of a dry gel. The bulk density was determined by weighing the dry gel and dividing by the geometric volume. In instances where a rod like geometry was not maintained or, as a verification of the above method, mercury displacement was employed. The bulk density of gel compositions measured by mercury displacement was carried out as follows. A clean empty glass cell is filled with mercury to a specific height and the cell is weighed. The mercury is then removed and the cell is cleaned again. Next, a dry gel sample of known weight is placed in the glass cell and mercury is added to the cell to the same specific height as before. the weight of the cell containing mercury and the sample is measured. The weight of mercury in both cases is then converted to a volume based on the density of mercury. The difference between the volume of mercury which fills an empty cell and the volume of mercury which fills the cell containing a sample is known as the displaced volume. Since mercury does not wet the sample this volume is equal to the total volume of the sample. The density is then determined by dividing the weight of the sample by the displaced volume.

Rub-off

The rub-off of the gel compositions were measured in the following manner. A dry gel of specific size (approximately 6 mm in diameter by 25 mm tall) was slid several times for 2–3 inches along its 25 mm length against a white cloth, using hand pressure. The relative extent of carbon deposition was then compared to a calibrated computer generated gray scale. The computer generates varying shades of gray and assigns numbers ranging from 0 to 50 depending on the extent of gray. As the numbers increase from 0 to 50, so does the relative extent of gray. After the gel was applied to the cloth, a visual comparison between the deposited carbon, and the computer chart was made, and a gray scale number assigned accordingly. Lower numbers correspond to less rub-off. The rub-off values in combination with the SEM photographs are used to determine whether the carbonaceous material is attached to the gel component.

The following examples illustrate methods of modifying carbonaceous materials and the production of gel compositions, including gel compositions of the present invention, from an alkoxide precursor and a sodium silicate precursor.

EXAMPLES

Three carbon blacks, CB-A, CB-B and CB-C, were utilized in the following examples. The analytical properties of each of the carbon blacks, as determined by the procedures described above, were as shown in Table 1 below:

TABLE 1

Carbon Black Analytical Properties

| Carbon Black | $N_2SA$ $(m^2/g)$ | DBP (ml/100 g) | Avg. Primary Particle Size (nm) |
|---|---|---|---|
| CB-A | 24 | 132 | 130 |
| CB-B | 230 | 70 | 16 |
| CB-C | 560 | 120 | 16 |

Modification of Carbonaceous Materials

Examples 14 illustrate methods of modifying carbonaceous materials, in particular carbon blacks. These examples also set forth the procedures utilized to produce the modified carbon blacks, Modified CB-A, Modified CB-B, Phenolic CB-B and Modified CB-C utilized in the remaining examples.

Example 1

This example illustrates the preparation of a modified carbon black product utilizing the carbon black designated as CB-A in Table 1 above.

Two hundred grams of CB-A was added to a solution of 10.1 g sulfanilic acid and 6.23 g of concentrated nitric acid in 21 g of water. A solution of 4.87 g of $NaNO_2$ in 10 g of water was added to the rapidly stirring mixture. 4-Sulfobenzenediazonium hydroxide inner salt is formed in situ, which reacts with the carbon black. After 15 minutes, the dispersion was dried in an oven at 125 C.

The resulting carbon black product was designated "Modified CB-A" and is a carbon black having attached 4-$C_6H_4SO_3^-$ groups.

Example 2

This example illustrates the preparation of a modified carbon black product utilizing the carbon black designated as CB-B in Table 1 above.

A solution prepared from 36.2 g sulfanilic acid, 8.76 g NaOH and 162 g of water was cooled in ice. Twenty grams of $NO_2$ was added with stirring and the resulting suspension was warmed to 75 C. and added without delay to a pelletizer containing 300 g of CB-B. After pelletizing for three minutes, 35 g of additional water was added. After pelletizing for two additional minutes, the product was removed from the pelletizer and dried in an oven at approximately 125° C. The product had a 325 mesh residue of 0.14%, compared to 94% for the unreacted carbon black The resulting carbon black product was designated "Modified CB-B" and is a carbon black having attached 4-$C_6H_4SO_3^-$ groups.

Example 3

This example illustrates the preparation of a different modified carbon black product, than Example 2, utilizing the carbon black designated as CB-B in Table 1 above.

5Amino-2-hydroxybenzene sulfonic acid (1.89 g) was dissolved in 100 g of warm water, 10 g of CB-B was added and the mixture was cooled to room temperature. Concentrated HCl (1.18 g) was added and then a solution of 0.85 g sodium nitrite in water was added, forming a diazonium salt in situ, which reacts with the carbon black. After stirring for 15 minutes, the resulting dispersion was dried in an oven at 125 C. The product had a 325 mesh residue of 0.06%, compared to 94% for the unreacted carbon black.

The resulting carbon black product was designated "Phenolic CB-B" and is a carbon black having attached 4,3-$C_6H_4$(OH)($SO_3^-$) groups.

Example 4

This example illustrates the preparation of a modified carbon black product utilizing the carbon black designated as CB-C in Table 1 above.

Two hundred grams of CB-C was mixed into 2.8 L of water. Sulfanilic acid (42.4 g) was dissolved into the stirring mixture, and then a cold solution of 25.5 g $NO_2$ in 100 g of water was added with rapid stirring. 4-Sulfobenzenediazonium hydroxide inner salt is formed in situ, which reacts with the carbon black. Bubbles were released. After stirring for one hour, 5 g of $NO_2$ was introduced directly into the mixture. The dispersion was stirred for 15 minutes, left overnight and dried in an oven at 130° C.

The resulting carbon black product was designated "Modified CB-C" and is a carbon black having attached 4-$C_6H_4SO_3^-$ groups.

As illustrated in the following examples, the modified carbon blacks, Modified CB-A, Modified CB-B, Phenolic CB-B and Modified CB-C were attachable to a gel component and utilized to form gel compositions of the present invention. For comparison purposes, gel compositions were also prepared utilizing the unmodified carbon blacks, CB-A, CB-B and CB-C.

Alkoxide Gel Precursor (Up to 50%. by Weight (Solids) Loading) Examples

Examples 5–22 are directed to gels produced from an alkoxide precursor only, and with an amount, less than or equal to 50%, by weight (solids), of a carbonaceous component.

Example 5

A concentrated silica sol was prepared by mixing 61 ml (milliliters) of tetraethyl orthosilicate (98% pure), 61 ml of ethyl alcohol, 4.87 ml deionized water, and 0.2 ml of 1M hydrochloric acid in a 500 ml round bottom flask with vigorous stirring. The flask was placed in a heating mantle and the mixture refluxed with the aid of a condenser at 70° C. for 2 hours. The resulting sol, which contained 15% $SiO_2$ by weight, was cooled and stored at 5° C. until use.

Prior to gelation the sol was warmed to room temperature and the concentration was adjusted by dilution with ethyl alcohol such that the resulting mixture contained 11% $SiO_2$ by weight. This was accomplished by combining 70% by volume original sol with 30% by volume ethyl alcohol. Gelation was initiated by addition of 0.5M $NH_4OH$ in a volume ratio of 1:10 ammonia to sol. After the ammonia was added, the mixture was allowed to stir for 2–5 minutes and then cast into cylindrical tubes. Gelation occurred within 7–10 minutes. The gels were then sealed within the molds to prevent drying and aged at 50° C. for 24 hours. After the initial aging the gels were removed from the mold, placed in sealed tubes containing deionized water and aged further at 70° C. for an additional 24 hours. Upon removal from the oven the gels were rinsed several times with deionized water.

The gels were then placed in sealed tubes containing acetone and allowed to exchange pore fluid (primarily water) for 10 hours at 50° C. At the end of a 10 hour interval the gels were rinsed with acetone. This process was repeated a total of 3 times. After three such intervals a portion of the gels were then directly dried from acetone, first at 50° C. for 12 hours then at 140° C. for an additional 12 hours. The resulting gels showed some shrinkage and each had a measured bulk density of 0.5–0.6 g/cm$^3$.

The remaining gels were placed in sealed tubes containing heptane and allowed to exchange pore fluid for 10 hours at 50° C. At the end of a 10 hour interval the gels were rinsed with heptane. This process was repeated three times. After three such intervals the gels were then directly dried from heptane, first at 70° C. for 12 hours then at 140° C. for an additional 12 hours. These gels retained their cylindrical shapes with the least amount of shrinkage and each had a bulk density of 0.4–0.44 g/cm$^3$.

The bulk density and rub-off of representative samples of the gels dried in acetone and heptane were determined according to the procedures described herein. The results are provided in Tables 2 and 3 below.

Example 6

This example illustrates the production of gel compositions which contain an unmodified carbon black component, designated herein as "CB-A", having the analytical properties set forth in Table 1.

In this example the steps from Example 5 were substantially repeated with one exception. Prior to initiating gel formation a specific amount of CB-A was added to the sol which had been diluted down with 70% by volume original sol and 30% by volume ethyl alcohol. The amount of added carbon black was calculated such that the total solids content remained the same, so that in effect the amount of added carbon black replaced an equivalent mass of silica. In this example the desired solids content is 11% just as in Example 5. Therefore, of that 11% solids, 95% consisted of silica and the remaining 5% solids was added as free carbon black. In order to keep the solids content the same, the sol was diluted with an appropriate amount of ethyl alcohol to account for the adjusted silica content.

Once the relative ratios were determined the appropriate amount of carbon black was stirred into the sol for 5–10 minutes. CB-A was dispersed into the solution such that 5% of the total solids content was CB-A and the balance was silica. Gelation was initiated as in the previous example. The volume ratio used to promote gelation was maintained at 1:10 and the concentration of the base remained at 0.5M.

As in the previous Example, the ammonia was added, the CB-A was dispersed with vigorous stirring for 2–5 minutes and then cast into cylindrical tubes. Gelation occurred within 8–12 minutes. The gels were then aged for 24 hrs at 50° C., then removed from the casts and aged another 24 hours in deionized water at 70° C. The gels were then solvent exchanged and dried as outlined in Example 5, from acetone and heptane.

The bulk density and rub-off of representative samples of the gels dried in acetone and heptane were determined according to the procedures described herein. The results are provided in Tables 2 and 3 below.

Examples 7–11

The steps from Example 6 were repeated with the exception that the amount of CB-A was increased from 10 to 50% of the total solids, the balance being silica. The particular amount of carbon black utilized in each example, as a percentage of total solids, is shown in the Table below:

| Example | Amount of Carbon Black (CB-A) % Total Solids |
|---|---|
| 7 | 10 |
| 8 | 15 |
| 9 | 20 |
| 10 | 30 |
| 11 | 50 |

When the amount of CB-A varied from 10 to 20% the wet gels were noticeably stronger. For a given solvent, the dried gels demonstrated reduced shrinkage and lower bulk density as the CB-A content increased. One factor that was independent of the carbon black content was the rub-off characteristic of each of the dried gels. Upon handling a dried gel which contained CB-A, a significant amount of residual carbon black was deposited from the material onto the gloves with which they were handled and to the surrounding media. In addition, the attrition rate of carbon fines for the gels prepared with CB-A was substantial. The rub-off characteristics, and substantial attrition rates, of the gels indicate the presence of carbon black which was not attached to the gel component.

The bulk density and rub-off of representative samples of the gels dried in acetone and heptane, from each example, were determined according to the procedures described herein. The results are provided in Tables 2 and 3 below.

Example 12

This example illustrates the production of a gel composition of the present invention comprising a carbon black attached to a gel component.

In this Example the procedures used in Examples 6–11 were substantially repeated with the exception that the gel compositions incorporated the Modified CB-A of Example 1.

As in Example 6 the Modified CB-A was dispersed into the partially hydrolyzed silica solution such that 5% of the total solids content was Modified CB-A and the balance was silica. A set of gels were then prepared with the addition of ammonia, aged in the same manner as described earlier, solvent exchanged with acetone and heptane, and dried as outlined in Examples 7–11.

The Modified CB-A was dispersed more easily and remained dispersed longer in terms of settling behavior than the unmodified CB-A. In the wet state the gels seemed stronger than those without carbon black and slightly stronger than gels containing unmodified CB-A. For a given solvent, however, the bulk density was lower for materials made using the Modified CB-A. More important was the observation that the rub-off behavior was significantly reduced indicating that the carbon black was actively incorporated in the gel network, and attached to the gel component.

The bulk density and rub-off of representative samples of the gels dried in acetone and heptane were determined according to the procedures described herein. The results are provided in Tables 2 and 3 below.

Examples 13–17

These examples illustrate the production of gel compositions of the present invention which comprise a carbon black attached to a gel component.

The steps from Example 12 were repeated with the exception that the amount of Modified CB-A was increased from 10 to 50% of the total solids, the balance being silica. The particular amount of carbon black utilized in each example, as a percentage of total solids, is shown in the Table below:

| Example | Amount of Carbon Black (Modified CB-A) % Total Solids |
|---|---|
| 13 | 10 |
| 14 | 15 |
| 15 | 20 |
| 16 | 30 |
| 17 | 50 |

When compared to gels produced with unmodified CB-A the dried gels of examples 13–17, incorporating Modified CB-A, demonstrated reduced shrinkage and lower bulk densities for a given solvent as the Modified CB-A content increased. In addition, for a given solvent and Modified CB-A content the wet gels were physically stronger and the dried gels had lower bulk densities as compared to gels prepared with the unmodified CB-A.

Another distinguishing feature of the entire Modified CB-A gel series was a noticeable difference in the rub-off behavior. Upon handling the dry gels, a substantial reduction in residual carbon deposited on gloves and surrounding media was noted in comparison with the gel compositions produced with unmodified CB-A. The attrition rate of carbon fines for the gels prepared with Modified CB-A was also greatly diminished in comparison with the gels produced with unmodified CB-A. These results indicate that the Modified CB-A was attached to the gel component.

The bulk density and rub-off of representative samples of the gels dried in acetone, and heptane, from each example, were determined according to the procedures described herein. The results are provided in Tables 2 and 3 below.

Example 18

In this Example the procedures used in Examples 6–12 were substantially repeated utilizing a different carbon black, designated herein as "CB-B", having the analytical properties set forth in Table 1.

As in the previous Examples, CB-B was dispersed into the partially hydrolyzed silica solution such that 15% of the total solids content was CB-B and the balance was silica. A set of gels were then prepared with the addition of ammonia, aged, solvent exchanged and dried as outlined in Example 5.

The bulk density and rub-off of representative samples of the gels dried in acetone and heptane was determined according to the procedures described herein. The results are provided in Tables 2 and 3 below.

Example 19

This example illustrates the production of a gel composition of the present invention comprising a carbon black attached to a gel component.

In this Example the procedures used in Example 18 were substantially repeated with the exception that the gel compositions incorporated the Modified CB-B of Example 2.

As in the previous Examples the Modified CB-B was washed according to the established protocol and then dispersed into the partially hydrolyzed silica solution such that 15% of the total solids content was Modified CB-B and the balance was silica A set of gels were then prepared, aged in the same manner as described earlier, solvent exchanged with acetone and heptane, and dried as outlined in the previous Examples.

The bulk density and rub-off of representative samples of the gels dried in acetone and heptane were determined according to the procedures described herein. The results are provided in Tables 2 and 3 below.

Example 20

This example illustrates the production of a gel composition of the present invention comprising a carbon black attached to a gel component.

In this Example the procedures used in Example 19 were substantially repeated with the exception that the gel compositions incorporated the Phenolic CB-B of Example 3.

As in the previous Examples, the Phenolic CB-B was washed and then dispersed into the partially hydrolyzed silica solution such that 15% of the total solids content was Phenolic CB-B and the balance was silica. A set of gels were then prepared with the addition of ammonia, solvent exchanged and dried as outlined in the prior examples.

The bulk density and rub-off of representative samples of the gels dried in acetone and heptane were determined according to the procedures described herein. The results are provided in Tables 2 and 3 below.

Example 21

In this Example the procedures used in the previous Examples 5–21 were substantially repeated utilizing a different carbon black, designated herein as "CB-C", having the analytical properties set forth in Table 1.

As in the previous Examples, the CB-C was dispersed into the partially hydrolyzed silica solution such that 15% of the total solids content was CB-C and the balance was silica. A set of gels were then prepared with the addition of ammonia, solvent exchanged and dried as outlined in the prior Examples.

The bulk density and rub-off of representative samples of the gels dried in acetone and heptane were determined according to the procedures described herein. The results are provided in Tables 2 and 3 below.

Example 22

This example illustrates the production of a gel composition of the present invention comprising a carbon black attached to a gel component.

In this Example the procedures used in Example 21 were substantially repeated with the exception that the gel compositions incorporated the Modified CB-C of Example 4.

As in the previous Examples, the Modified CB-C was washed and then dispersed into the partially hydrolyzed silica solution such that 15% of the total solids content was Modified CB-C and the balance was silica. A set of gels were then prepared with the addition of ammonia, solvent exchanged and dried as outlined in the prior Examples.

The bulk density and rub-off of representative samples of the gels dried in acetone and heptane were determined according to the procedures described herein. The results are provided in Tables 2 and 3 below.

TABLE 2

Alkoxide Precursor Gels (≦50% Carbon) Dried in Acetone

| Example | Carbon Black | Carbon Black %, by weight (solids) | Drying Solvent | Bulk Density (g/cm³) | Rub Off |
|---|---|---|---|---|---|
| 5 | None | None | Acetone | 0.60 | — |
| 6 | CB-A | 5% | Acetone | 0.55 | 17.5 |
| 7 | CB-A | 10% | Acetone | 0.45 | 23 |
| 8 | CB-A | 15% | Acetone | 0.48 | 35 |
| 9 | CB-A | 20% | Acetone | 0.43 | 40 |
| 10 | CB-A | 30% | Acetone | 0.49 | 35 |
| 11 | CB-A | 50% | Acetone | 0.51 | 45 |
| 12 | Modified CB-A | 5% | Acetone | 0.45 | 7.5 |
| 13 | Modified CB-A | 10% | Acetone | 0.43 | 15 |
| 14 | Modified CB-A | 15% | Acetone | 0.38 | 15 |
| 15 | Modified CB-A | 20% | Acetone | 0.38 | 25 |
| 16 | Modified CB-A | 30% | Acetone | 0.42 | 25 |
| 17 | Modified CB-A | 50% | Acetone | 0.47 | 30 |
| 18 | CB-B | 15% | Acetone | 0.45 | 25 |
| 19 | Modified CB-B | 15% | Acetone | 0.44 | 15 |
| 20 | Phenolic CB-B | 15% | Acetone | 0.35 | 10 |
| 21 | CB-C | 15% | Acetone | 0.38 | 35 |
| 22 | Modified CB-C | 15% | Acetone | 0.37 | 15 |

TABLE 3

Alkoxide Precursor Gels (≦50% Carbon) Dried in Heptane

| Example | Carbon Black | Carbon Black %, by weight (solids) | Drying Solvent | Bulk Density (g/cm³) | Rub Off | SEM FIG. # |
|---|---|---|---|---|---|---|
| 5 | None | None | Heptane | 0.40 | — | 1 |
| 6 | CB-A | 5% | Heptane | 0.38 | 15 | — |
| 7 | CB-A | 10% | Heptane | 0.37 | 20 | — |
| 8 | CB-A | 15% | Heptane | 0.31 | 30 | 2 |
| 9 | CB-A | 20% | Heptane | 0.34 | 40 | — |
| 10 | CB-A | 30% | Heptane | 0.36 | 35 | — |
| 11 | CB-A | 50% | Heptane | 0.41 | 45 | — |
| 12 | Modified CB-A | 5% | Heptane | 0.36 | 5 | — |
| 13 | Modified CB-A | 10% | Heptane | 0.34 | 15 | — |
| 14 | Modified CB-A | 15% | Heptane | 0.29 | 10 | 3 |
| 15 | Modified CB-A | 20% | Heptane | 0.30 | 25 | — |
| 16 | Modified CB-A | 30% | Heptane | 0.31 | 20 | — |

TABLE 3-continued

Alkoxide Precursor Gels (≦50% Carbon) Dried in Heptane

| Example | Carbon Black | Carbon Black %, by weight (solids) | Drying Solvent | Bulk Density (g/cm³) | Rub Off | SEM FIG. # |
|---------|--------------|------------------------------------|----------------|----------------------|---------|------------|
| 17 | Modified CB-A | 50% | Heptane | 0.33 | 30 | — |
| 18 | CB-B | 15% | Heptane | 0.36 | 25 | 4 |
| 19 | Modified CB-B | 15% | Heptane | 0.31 | 10 | 5 |
| 20 | Phenolic CB-B | 15% | Heptane | 0.26 | 5 | 6 |
| 21 | CB-C | 15% | Heptane | 0.31 | 30 | 7 |
| 22 | Modified CB-C | 15% | Heptane | 0.30 | 10 | 8 |

SEM FIG. # = Scanning Electron Microscope Figure Number

Figure 5:
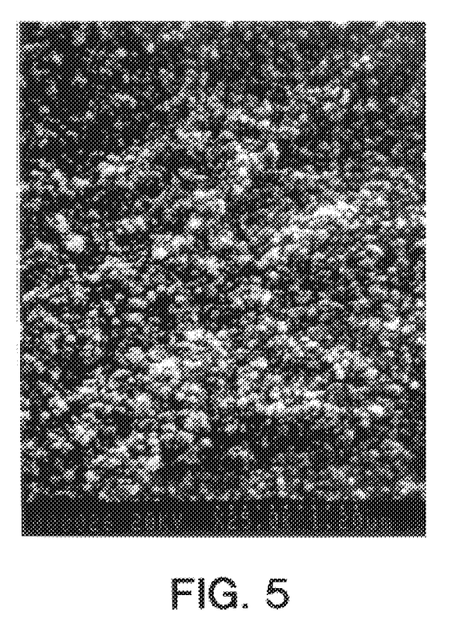
FIG. 5 is a SEM photograph of a fracture surface of the gel composition, dried from heptane, produced in Example 19.
Figure 6:
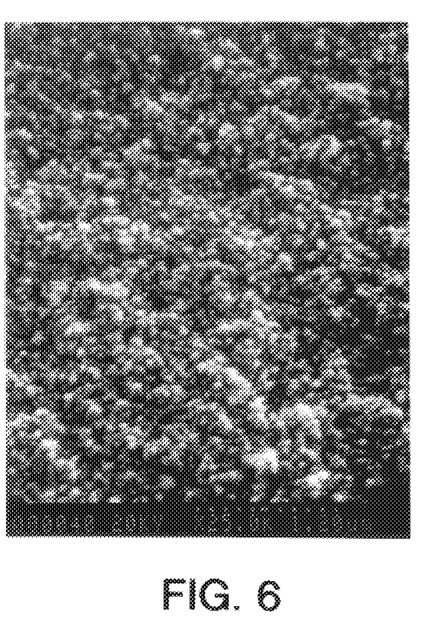
FIG. 6 is a SEM photograph of a fracture surface of the gel composition, dried from heptane, produced in Example 20.
Figure 8:
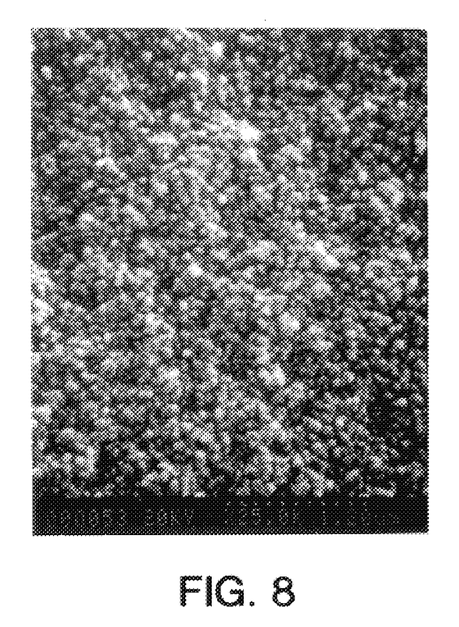
FIG. 8 is a SEM photograph of a fracture surface of the gel composition, dried from heptane, produced in Example 22.

As shown by the SEM photographs, in particular FIG. 3 of the gel composition of the present invention of Example 14, FIG. 5 of the gel composition of the present invention of Example 19, FIG. 6 of the gel composition of the present invention of Example 20 and FIG. 8 of the gel composition of the present invention of Example 22, the modified carbon blacks are attached to the silica gel component in the gel compositions of the present invention. As illustrated in FIGS. 3, 5, 6 and 8, minimal amounts or none of the attached carbonaceous component (modified carbon black) appears as a distinct aggregate in fracture surface SEM's of these gel compositions. These results indicate that the modified carbon black is attached to the silica gel component in several places and that the silica to carbon black link is stronger than the silica to silica links in conventional gel compositions which do not include a carbonaceous component attached to the gel component.

Figure 4:
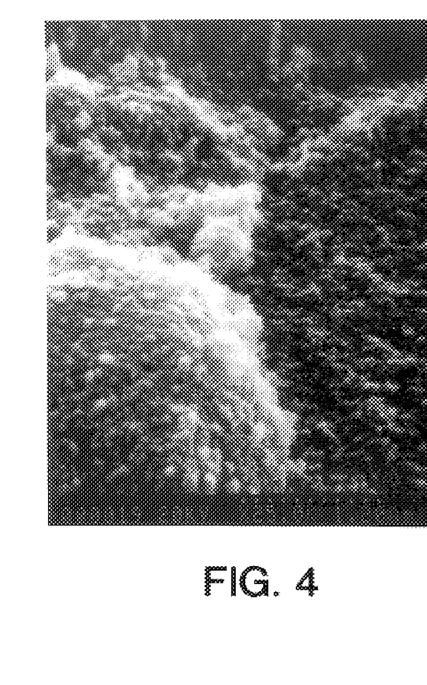
FIG. 4 is a SEM photograph of a fracture surface of the gel composition, dried from heptane, produced in Example 18.
Figure 7:
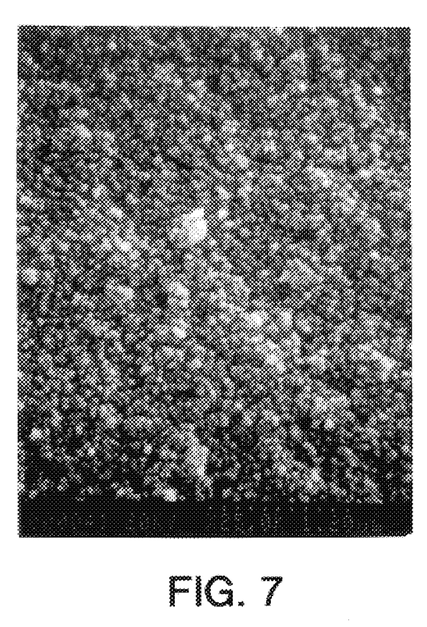
FIG. 7 is a SEM photograph of a fracture surface of the gel composition, dried from heptane, produced in Example 21.

In contrast, as illustrated in FIGS. 2, 4 and 7, fracture surface SEM's of gel compositions which include a carbonaceous component which is not attached to the gel component, show distinct aggregates of the carbon black. In these gel compositions, the carbon black is not attached to the silica gel component.

Sodium Silicate Gel Precursor (Up to 50%, by Weight (Solids) Loading) Examples Examples 23–28 are directed to gels produced from a sodium silicate precursor and less than or equal to 50%, by weight (solids), of a carbonaceous component.

Example 23

A silica stock solution was prepared by mixing commercially available sodium silicate ($SiO_2/Na_2O$ molar ratio of 3.22:1) with deionized water in a volume ratio of 1.33:1 water to sodium silicate. The temperature of the mixture was maintained at 15° C. with vigorous stirring in a jacketed beaker. A separate solution comprising 2M $H_2SO_4$ was prepared by diluting concentrated sulfuric acid (96%) with water. An aliquot of 104 ml of the sodium silicate stock solution was then slowly added to 50 ml of stirred 2M acid. The rate of silicate addition was kept constant at 1 ml/minute and the acid solution was maintained at 15° C. in a jacketed beaker. The resulting silica sol contained approximately 10 wt % silica in a salty solution.

Gelation was accomplished by controlled addition of 1M NaOH until the pH of the sol reached 5. At this point the sol was vigorously stirred for 1 minute and then cast into cylindrical tubes. Gelation occurred in 5 minutes and the tubes were sealed to prevent drying.

The gels were allowed to age for 1–2 hours at 50° C. in the molds after which they were placed in sealed tubes containing deionized water and kept at room temperature. Fresh water was added every 3 hours for a total of 12 hours at which time it was determined (by insertion of a sodium electrode) that the sodium sulfate salt was completely removed from the gel.

The gels were then aged at 70° C. in deionized water for up to 24 hours. Upon removal from the oven the gels were rinsed several times with deionized water, placed in sealed tubes with acetone and allowed to exchange pore fluid for 10 hours at 50° C. At the end of 10 hours the gels were rinsed with acetone and stored in fresh acetone at 50° C. This procedure was repeated three times.

After three such intervals, the gels were placed in sealed tubes containing heptane and allowed to exchange pore fluid for 10 hours. At the end of 10 hours the gels were rinsed with heptane and stored in fresh heptane at 50° C. This procedure was repeated three times.

After three such intervals, the gels were dried directly from heptane, first at 70° C. for 12 hours then at 140° C. for an additional 12 hours. The resulting dried gels retained their cylindrical forms and exhibited minimal shrinkage.

The bulk density and rub-off of a representative sample of the gel compositions were determined according to the procedures described herein. The results are provided in Table 4 below.

Example 24

This example illustrates the production of gel compositions which contain an unmodified carbon black component, designated herein as "CB-A", having the analytical properties set forth in Table 1.

The steps from Example 23 were substantially repeated with some processing changes. Prior to initiating gel formation a specific amount of a particular carbon black, CB-A (as in Examples 6–11) was added to the sol. The amount of added carbon black was calculated such that the total solids content remained the same, so that in effect the amount of added carbon black replaced an equivalent mass of silica. In this example, the desired solids content is 10%, just as in Example 23. Therefore, of the 10% solids, 90% consisted of silica and the remaining 10% solids were added as free carbon black (CB-A). In order to keep the solids content the same, the sol was diluted with an appropriate amount of deionized water to account for the adjusted silica content.

Once the relative ratios were determined, the appropriate amount of carbon black was stirred into the sol for 5–10 minutes. In this example, CB-A was dispersed into the solution containing sodium silicate combined with sulfuric acid such that 10% of the total solids content was CB-A and the balance was silica. Gelation was initiated as in Example 23, by increasing pH with 1M NaOH to a final pH of 5.

After gelation the materials were aged at 50° C. for 1–2 hours, as in Example 23, removed from the molds, and then washed free of salt for 12 hours at room temperature. The loaded gels were then solvent exchanged and dried as outlined in Example 23, from heptane.

The bulk density and rub-off of a representative sample of the gel compositions were determined according to the procedures described herein. The results are provided in Table 4 below.

Example 25

This example illustrates the production of a gel composition of the present invention comprising a carbon black attached to a gel component.

In this Example the procedures used in Example 24 were substantially repeated with the exception that the gel compositions incorporated the Modified CB-A of Example 1.

The Modified CB-A was dispersed in a beaker of acetone, vacuum filtered, and then rinsed repeatedly with deionized water until the pH of the wash water was close to neutral. The Modified CB-A was then dried at 140° C. for 12 hours.

As in Example 24 the Modified CB-A was dispersed into the solution containing sodium silicate combined with sulfuric acid such that 10% of the total solids content was Modified CB-A and the balance was silica. In contrast to unmodified CB-A, addition of Modified CB-A was limited due to the stability of the surface groups. Only at pH values greater than 3 could Modified CB-A be introduced into the sol such that the surface modification could be preserved. Therefore, the pH was carefully raised to 3 with controlled addition of 1M NaOH and the appropriate amount of Modified CB-A dispersed into the sol. Gelation was achieved, as before, by controlled addition of 1M NaOH until the pH of the sol reached 5.

After gelation the materials were aged at 50° C. for 1–2 hours as before, removed from the molds, and then washed free of salt for 12 hours at room temperature. The gel compositions were then aged up to 24 hours at 70° C. in deionized water. A portion of the gels were then solvent exchanged and dried from heptane as outlined in the prior Examples.

The bulk density and rub-off of a representative sample of the gel compositions were determined according to the procedures described herein. The results are provided in Table 4 below.

Example 26

In this Example the procedures used in Example 24 were substantially repeated utilizing a different carbon black, designated herein as "CB-B", having the analytical properties set forth in Table 1.

Prior to initiating gel formation a specific amount of CB-B (as above), was added to the sol. The amount of added CB-B was calculated such that the total solids content remained the same, so that in effect the amount of added CB-B replaced an equivalent mass of silica. In this example, the desired total solids content is 10% just as in Example 23. Therefore, of that 10% solids, 90% consisted of silica and the remaining 10% solids were added as free CB-B. In order to keep the solids content the same, the sol was diluted with an appropriate amount of deionized water to account for the adjusted silica content.

Once the relative ratios were determined, the appropriate amount of carbon black was stirred into the sol for 5–10 minutes. In this example, CB-B was dispersed into the solution containing sodium silicate combined with sulfuric acid such that 10% of the total solids content was CB-B and the balance was silica. Gelation was initiated as in the previous examples by increasing pH with 1M NaOH to a final pH of 5.

After gelation, the materials were aged at 50° C. for 1–2 hours as before, removed from the molds and then washed free of salt for 12 hours at room temperature. The gel compositions were then aged up to 24 hours at 70° C. in deionized water. A portion of the gel compositions were then solvent exchanged and dried from heptane as outlined in the prior examples.

The bulk density and rub-off of a representative sample of the gel compositions were determined according to the procedures described herein. The results are provided in Table 4 below.

Example 27

This example illustrates the production of a gel composition of the present invention comprising a carbon black attached to a gel component.

In this Example the procedures used in Example 26 were substantially repeated with the exception that the gel compositions incorporated the Modified CB-B of Example 2.

The Modified CB-B was dispersed in a beaker of acetone, vacuum filtered, and then rinsed repeatedly with deionized water until the pH of the wash water was close to neutral. The Modified CB-B was then dried at 140° C. for 12 hours.

As in Example 24, the Modified CB-B was dispersed into the solution containing sodium silicate combined with sulfuric acid such that 10% of the total solids content was Modified CB-B and the balance was silica. In contrast to unmodified CB-B, addition of Modified CB-B was limited due to the stability of the surface groups. Only at pH greater than 3 could Modified CB-B be introduced into the sol such that the surface modification could be preserved. Therefore, the pH was carefully raised to 3 with controlled addition of 1M NaOH and the appropriate amount of Modified CB-B dispersed into the sol. Gelation was achieved as before by controlled addition of 1M NaOH until the pH of the sol reached 5.

After gelation, the materials were aged at 50° C. for 1–2 hours as before, removed from the molds, and then washed free of salt for 12 hours at room temperature. The gel compositions were then aged up to 24 hours at 70° C. in deionized water. The gels were then solvent exchanged and dried from heptane as outlined in the prior Examples.

The bulk density and rub-off of a representative sample of the gel compositions were determined according to the procedures described herein. The results are provided in Table 4 below.

Example 28

This example illustrates the production of a gel composition of the present invention comprising a carbon black attached to a gel component.

In this Example the procedures used in Example 26 were substantially repeated with the exception that the gel compositions incorporated the Phenolic CB-B of Example 3.

The Phenolic CB-B was dispersed in a beaker of acetone, vacuum filtered, and then rinsed repeatedly with deionized water until the pH of the wash water was close to neutral. The Phenolic CB-B was then dried at 140° C. for 12 hours.

As in Example 24, the Phenolic CB-B was dispersed into the solution containing sodium silicate combined with sulfuric acid such that 10% of the total solids content was Phenolic CB-B and the balance was silica. In contrast to unmodified CB-B, addition of Phenolic CB-B was limited due to the stability of the surface groups. Only at pH values greater than 3 could Phenolic CB-B be introduced into the sol such that the surface modification could be preserved. Therefore, the pH was carefully raised to 3 with controlled addition of 1M NaOH and the appropriate amount of Phenolic CB-B dispersed into the sol. Gelation was achieved as before by controlled addition of 1M NaOH until the pH of the sol reached 5.

After gelation, the materials were aged at 50° C. for 1–2 hours as before, removed from the molds, and then washed free of salt for 12 hours at room temperature. The gel compositions were then aged up to 24 hours at 70° C. in deionized water. The gels were then solvent exchanged and dried from heptane as outlined in the prior Examples.

The bulk density and rub-off of a representative sample of the gel compositions were determined according to the procedures described herein. The results are provided in Table 4 below.

TABLE 4

Sodium Silicate Precursor Gels (≤50% Carbon)

| Example | Carbon Black | Amount | Drying Solvent | Bulk Density | Rub-Off |
|---|---|---|---|---|---|
| 23 | None | None | Heptane | 0.20 g/cm3 | — |
| 24 | CB-A | 10% | Heptane | 0.22 g/cm3 | 25 |
| 25 | Modified CB-A | 10% | Heptane | 0.21 g/cm3 | 15 |
| 26 | CB-B | 10% | Heptane | 0.19 g/cm3 | 16 |
| 27 | Modified CB-B | 10% | Heptane | 0.19 g/cm3 | 7 |
| 28 | Phenolic CB-B | 10% | Heptane | 0.21 g/cm3 | 2.5 |

Alkoxide Precursor (Greater than 50%, by Weight (Solids) Loading) Examples

Examples 29–34 are directed to gels produced from an alkoxide precursor and greater than 50%, by weight (solids), of a carbonaceous component.

Example 29

The steps from Example 11 were repeated with the exception that the amount of CB-A was increased to 60% of the total solids contents and the aging and drying steps were changed. As before, the appropriate amount of CB-A was added and the sol was diluted with ethyl alcohol to maintain a constant total solids content. Gelation was initiated in the same fashion as in previous examples 5–22. The gels were then aged for 24 hours at 50° C. in the sealed cylindrical molds. Instead of washing with water and aging at 70° C., these gels were then dried directly from the mother liquor, first at 50° C. for 10 hours, then at 140° C. for 10 hours.

The resulting products were incoherent bodies largely comprising fines. The bulk density of a representative sample of the resulting product was determined by the procedure described herein. The result is set forth in Table 5 below.

Example 30

This example illustrates the production of a gel composition of the present invention comprising a carbon black attached to a gel component.

In this Example the procedures used in Example 29 were substantially repeated with the exception that the gel compositions incorporated the Modified CB-A of Example 1.

As in previous examples, the Modified CB-A was washed and then dispersed into the partially hydrolyzed silica solution such that 60% of the total solids content was Modified CB-A and the balance was silica. As before, the sol was diluted with ethyl alcohol to maintain a constant total solids content and gelation was initiated in an analogous fashion. The gels were then dried directly from the mother liquor as in Example 29, by aging for 24 hours at 50° C. in the sealed cylindrical molds, then at 140° C. for 10 hours.

The resulting products were in the form of solid, one-piece pellets which were physically hard. There was a negligible amount of carbon fines and the gel article was very durable and coherent when compared to the gel article made with an unmodified carbonaceous material in Example 29.

The bulk density of a representative sample of the resulting product was determined by the procedure described herein. The result is set forth in Table 5 below.

Example 31

This example illustrates the production of a gel composition of the present invention comprising a carbon black attached to a gel component.

The steps from Example 30 were repeated with the exception that the amount of Modified CB-A was increased to 70% of the total solids, the balance being silica. As before, the sol was diluted with ethyl alcohol to maintain a constant total solids content and gelation was initiated in an analogous fashion. The gels were then aged for 24 hours at 50° C. in the sealed cylindrical molds and then dried directly from the mother liquor, first at 50° C. for 10 hours, then at 140° C. for 10 hours.

The resulting pellets were hard and could be handled easily without breakage or generation of fines. The bulk density of a representative sample of the resulting product was determined by the procedure described herein. The result is set forth in Table 5 below.

Example 32

In this Example the procedures used in Example 29 were substantially repeated utilizing a different carbon black, designated herein as "CB-C", having the analytical properties set forth in Table 1.

The CB-C was dispersed into the partially hydrolyzed silica solution such that 80% of the total solids content was CB-C and the balance was silica. As before, the sol was diluted with ethyl alcohol to maintain a constant total solids content and gelation was initiated in an analogous fashion. The gels were then aged for 24 hours at 50° C. in the sealed cylindrical molds and then dried directly from the mother liquor, first at 50° C. for 10 hours, then at 140° C. for 10 hours.

The resulting article was analogous to that of Example 29, namely a weak, broken down gel was formed which consisted largely of carbon fines. The network was not coherent and lacked the structural integrity seen in the examples of the gel compositions of the present invention.

The bulk density of a representative sample of the resulting product was determined by the procedure described herein. The result is set forth in Table 5 below.

Example 33

This example illustrates the production of a gel composition of the present invention comprising a carbon black attached to a gel component.

In this Example the procedures used in Example 32 were substantially repeated with the exception that the gel compositions incorporated the Modified CB-C of Example 4.

As in previous examples, the Modified CB-C was washed and then dispersed into the partially hydrolyzed silica solution such that 80% of the total solids content was Modified CB-C and the balance was silica. As before, the sol was diluted with ethyl alcohol to maintain a constant total solids content and gelation was initiated in an analogous fashion. The gels were then aged for 24 hours at 50° C. in the sealed cylindrical molds and then dried directly from the mother liquor, first at 50° C. for 10 hours, then at 140° C. for 10 hours.

The resulting articles were pellets similar in appearance and integrity to those produced in Examples 30 and 31. Only a minimal amount of carbon fines existed and the gel was very coherent.

The bulk density of a representative sample of the resulting product was determined by the procedure described herein. The result is set forth in Table 5 below.

Example 34

This example illustrates the production of a gel composition of the present invention comprising a carbon black attached to a gel component.

The steps from Example 33 were repeated with the exception that the amount of Modified CB-C which was utilized in the gel composition was increased to 85% of the total solids content. As before, the appropriate amount of Modified CB-C was added, and the sol was diluted with ethyl alcohol to maintain a constant total solids content and gelation was initiated in an analogous fashion. The gels were then aged for 24 hours at 50° C. in the sealed cylindrical molds and then dried directly from the mother liquor, first at 50° C. for 10 hours, then at 140° C. for 10 hours.

The resulting pellets could be handled easily without breakage or generation of fines. The bulk density of a representative sample of the resulting product was determined by the procedure described herein. The result is set forth in Table 5 below.

Example 35

This example illustrates the production of a gel composition of the present invention comprising a carbon black attached to a gel component.

The steps from Example 33 were repeated with the exception that the amount of Modified CB-C which was utilized in the gel composition was increased to 90% of the total solids content As before, the appropriate amount of Modified CB-C was added and the sol was diluted with ethyl alcohol to maintain a constant total solids content and gelation was initiated in an analogous fashion. The gels were then aged for 24 hours at 50° C. in the sealed cylindrical molds and then dried directly from the mother liquor, first at 50° C. for 10 hours, then at 140° C. for 10 hours.

The resulting pellets could be handled easily without breakage or generation of fines. The bulk density of a representative sample of the resulting product was determined by the procedure described herein. The result is set forth in Table 5 below.

TABLE 5

| | | Alkoxide Precursor Gels (>50% Carbon) | | | |
|---|---|---|---|---|---|
| Example | Carbon Black | Amount | Drying Solvent | Bulk Density | Form |
| 29 | CB-A | 60% | Mother liquor | 0.53 g/cm3 | Fines |
| 30 | Modified CB-A | 60% | Mother liquor | 0.54 g/cm3 | Pellet |
| 31 | Modified CB-A | 70% | Mother liquor | 0.61 g/cm3 | Pellet |
| 32 | CB-C | 80% | Mother liquor | 0.66 g/cm3 | Fines |
| 33 | Modified CB-C | 80% | Mother liquor | 0.65 g/cm3 | Pellet |
| 34 | Modified CB-C | 85% | Mother liquor | 0.66 g/cm3 | Pellet |
| 35 | Modified CB-C | 90% | Mother liquor | 0.63 g/cm3 | Pellet |

The results of Examples 29–35 illustrate that gel compositions of the present invention, Examples 30, 31 and 33–35, produced with a carbonaceous component attached to the gel component are coherent solids. In contrast, gel compositions produced with a carbonaceous component which was not attached to the gel component, Examples 29 and 32, fell apart.

These results would indicate, to one of ordinary skill in the art, that gel compositions of the present invention, Examples 30, 31 and 33–35, are advantageous for use as adsorbents, in comparison to the gel compositions of Examples 29 and 32 which fell apart.

SUMMARY OF RESULTS

As a whole, the SEM and Rub-off data from the foregoing examples illustrates that in the gel compositions of the present invention the carbonaceous component (Modified CB-A, Modified CB-B, Phenolic CB-B and Modified CB-C) is attached to the gel component.

In particular, the gel compositions of the present invention produced in Examples 12–17, 19–20, 22, 25 and 27–28, having the carbonaceous component attached to the gel component have lower Rub-Off than comparable gel compositions produced in Examples 6–11, 18, 21, 24 and 26 wherein the carbonaceous component is not attached to the gel component. Although the data is not presented above, similar results would be expected for gel compositions of the present invention produced in 30–31 and 33–35, having the carbonaceous component attached to the gel component, in comparison to the gel compositions produced in Examples 29 and 32 wherein the carbonaceous component is not attached to the gel component.

Similarly, the SEM photographs, in particular FIG. 3 of the gel composition of the present invention of Example 14, FIG. 5 of the gel composition of the present invention of Example 19, FIG. 6 of the gel composition of the present invention of Example 20 and FIG. 8 of the gel composition of the present invention of Example 22, illustrate that the modified carbon blacks are attached to the silica gel component in the gel compositions of the present invention. As illustrated in FIGS. 3, 5, 6 and 8, minimal amounts, or none of, the attached carbonaceous component (modified carbon black) appears as a distinct aggregate in fracture surface SEM's of these gel compositions. These results indicate that the modified carbon black is attached to the silica gel component in several places and that the silica to carbon black link is stronger than the silica to silica links in conventional gel compositions which do not include a carbonaceous component attached to the gel component.

In contrast, as illustrated in FIGS. 2, 4 and 7, fracture surface SEM's of gel compositions which include a carbonaceous component which is not attached to the gel component, show distinct aggregates of the carbon black. In these gel compositions, the carbon black is not attached to the silica gel component.

It should be clearly understood that the forms of the present invention herein described are illustrative only and are not intended to limit the scope of the invention.

We claim:

1. A gel composition comprising:

a gel component, wherein said gel comprises silica and a carbon black product having attached at least one organic group, the organic group comprising a) at least one aromatic group, and b) at least one ionic group, at least one ionizable group, or a mixture of an ionic group and an ionizable group, wherein at least one aromatic group of the organic group is directly attached to the carbon black.

2. The gel composition of claim 1 wherein the organic group comprises a sulfophenyl group or a salt thereof; a carboxyphenyl or a salt thereof; or mixtures thereof.

3. The gel composition of claim 1 wherein the organic group comprises p-sulfophenyl or a salt thereof.

4. The gel composition of claim 1 wherein the ionic or ionizable group comprises a carboxylic acid or a salt thereof; a sulfonic acid or a salt thereof; a quaternary ammonium salt; or mixtures thereof.

5. A gel composition comprising:

a gel component, wherein said gel comprises silica and a carbon black product having attached at least one organic group, the organic group comprising: a) at least one $C_1$–$C_{12}$ alkyl group, and b) at least one ionic group, at least one ionizable group, or a mixture of an ionic group and an ionizable group, wherein at least one alkyl group of the organic group is directly attached to the carbon black.

6. The gel composition of claim 5 wherein the ionic or the ionizable group comprises an ethane sulfonic acid or a salt thereof.

7. Thermal insulation comprising:

a silica gel composition according to claim 1 or claim 5 comprising a carbon black produce attached to said gel component.

8. A gel composition according to claim 1 or claim 5 comprising:

a carbonaceous component attached to a gel component wherein the carbonaceous component comprises: carbon black, carbon fiber, activated carbon, graphitic carbon or mixtures thereof.

9. The gel composition of claim 8 wherein the carbonaceous component comprises 1–50%, by weight of the composition.

10. The gel composition of claim 9 wherein the carbonaceous component comprises 10–20%, by weight of the composition.

11. The gel composition of claim 8 wherein the carbonaceous component comprises 51–99%, by weight of the composition.

12. The gel composition of claim 11 wherein the carbonaceous component comprises 70–85%, by weight of the composition.

* * * * *